Patented June 17, 1930

1,765,318

UNITED STATES PATENT OFFICE

ROBERT H. VAN SCHAACK, JR., OF EVANSTON, AND ROBERT CALVERT, OF WILMETTE, ILLINOIS, ASSIGNORS TO VAN SCHAACK BROS. CHEMICAL WORKS, INC., OF CHICAGO, ILLINOIS

PROCESS FOR THE MANUFACTURE OF ACETIC ACID

No Drawing.   Application filed February 9, 1928. Serial No. 253,206.

An object of this invention is to prepare acetic acid from acetate of lime without distilling the acetic acid. Another object is to produce a solution of acetic acid suitable for use in the manufacture of esters of alcohols, for example, ethyl acetate and butyl acetate. Another object is to precipitate calcium sulfate, by the interaction of calcium acetate and sulfuric acid, under such conditions that the calcium sulfate may be separated with ease, as by filtration, from the liquid products of the reaction.

An example of one manner of practising our invention follows. One hundred parts by weight of commercial calcium acetate (containing combined organic acids equivalent to approximately 83% of calcium acetate) are stirred with a mixture of 100 parts of water and 80 of sulfuric acid of specified gravity equal to 66° Bé. The mass is maintained at about 80° C., with occasional agitation, for 22 hours, and is then filtered. The filter cake comprises the calcium sulfate. The filtrate contains much of the liberated organic acids, especially acetic acid, and also some of the excess sulfuric acid that was used above that required theoretically to convert the acetate of lime to calcium sulfate and free organic acids. To recover additional amounts of acids, the filter cake may be washed, for example, with water or a dilute aqueous solution of sulfuric acid, or acetic acid, or both.

Another specific example of one method of practising our invention is the following. One hundred parts by weight of commercial calcium acetate are mixed with a solution of 26 parts of acetic acid and 64 of concentrated sulfuric acid in 39 of water. The mixture is maintained at 100 to 105° C. for 9 hours. The precipitated calcium sulfate is then separated in a basket-type of centrifuge, the basket carrying a cloth or other filtering medium which retains the calcium sulfate and allows the liquid to pass through. The filter cake in the centrifuge may be washed, as, with water or a solution of sulfuric acid in water, to remove additional amounts of acids.

Many details may be varied without departing from the spirit of this invention. For filtering or centrifuging to separate the calcium sulfate from the liquid phase there may be substituted a settling process, for example, in continuously operating equipment made by the Dorr Company and sometimes known as "thickness."

In settling, the solid phase moves downward relative to the liquid phase and actually passes through the liquid. In filtering, in a usual type of filter or in a centrifuge, there is also relative movement of the liquid phase with respect to the solid, the liquid passing through the pores in a layer of the solid phase supported on the filtering medium.

As the temperatures of reaction, we have used to advantage those in the range from 80° C. up to the boiling point of the reaction mixture, for example, 80° C. to 105° C., although lower temperatures than 80° C. may be satisfactory under certain conditions.

The time of reaction of the sulfuric acid solution upon the acetate of lime should be sufficiently long to allow the precipitated calcium sulfate to assume such a form as to permit of ready separation from the liquid by filtering, centrifuging, or settling. We have used 4 to 48 hours. Satisfactory periods are 6 to 24 hours, the shorter periods being useful in those reactions at temperatures near the boiling point of the reacting mixture, as at 100 to 05° C.

The composition of the reacting mixture may be varied within limits, so long as the composition is one that permits of the formation of calcium sulfate particles of the desired ease of separation by mechanical means, for example, settling or filtration. We have discovered that these desired properties are produced by such compositions as those illustrated in the two examples above. We have found that the presence in the reaction mixture of added water greatly changes the rate of settling, filtering, or centrifuging of the precipitated calcium sulfate. Omitting the water from the compositions illustrated resulted in semi-gelatinous mixtures which were not filtered satisfactorily. As a result of these observations, we use an amount of water equal to not less than 20 per cent, for example 35 to 200 per cent, of the weight of the acetate of lime. Still larger proportions of water than 200 per cent may be used, the disadvantage being a lower concentration of acetic acid in the liquid phase or filtrate. A somewhat smaller proportion of water than 35 per cent may be employed, the gain being the higher concentration of acetic acid in the liquid phase or filtrate and the disadvantage being the slower filtration or separation rate of the calcium sulfate. We have used with success 35 to 100 parts by weight of water to 100 of commercial acetate of lime, the smaller proportion being used to advantage when the temperature of decomposition of the acetate by sulfuric acid is approximately 105° C.

To increase the concentration of acetic acid in the filtrate, it is sometimes desirable to add part or all of the water, required in the reaction mixture, in the form of a solution comprising acetic acid. For this purpose the filtrate or water washings of the filter cake from a previous preparation may be used. We have used, for example, solutions comprising 0 to 200 parts of acetic acid by weight to 100 of water.

The proportion of sulfuric acid to calcium acetate may also be varied within limits. To decompose completely the calcium acetate and thus liberate substantially all of the organic acids present, we use a quantity of sulfuric acid which is at least theoretically equivalent to the volatile acids of the calcium acetate, these acids being determined by the usual method of analysis. In some preparations, we have used 10 to 100 per cent more sulfuric acid than this theoretical amount.

The vessel in which the liberation of acetic acid is made by the action of sulfuric acid upon acetate of lime may be provided with a reflux condenser for returning to the vessel any substances that may be volatilized.

By this invention it is possible to produce a precipitate of calcium sulfate of such properties as to permit ready filtration or settling. Thus we have been able to form filter cakes, 2 inches thick, of this calcium sulfate in a 3-minute period and to wash them with water, in a 20-minute period, so well that the remaining cake contains less than 0.1 per cent of total acid, calculated as acetic. This gives, therefore, a yield of approximately 99.8 per cent of the acetic acid in the form of a filtrate that may be used for commercial purposes, for example, esterification with ethyl alcohol, or butyl alcohol to give esters.

We claim:

1. The process of manufacturing acetic acid which comprises the interaction of sulfuric acid and calcium acetate, in the presence of added water, at 80° to 105° C., and the separation of the resulting calcium sulfate by filtration.

2. The process of manufacturing acetic acid which comprises the interaction of sulfuric acid and calcium acetate, in the presence of added water, at approximately 105° C., and the separation of the resulting calcium sulfate by filtration.

3. The process of manufacturing acetic acid which comprises the interaction, for 6 to 24 hours, of sulfuric acid and calcium acetate, in the presence of added water, at 80° to 105° C., and the separation of the resulting calcium sulfate by filtration.

4. The process of manufacturing acetic acid which comprises the interaction, for nine hours, of sulfuric acid and calcium acetate, in the presence of added water, at approximately 105° C., and the separation of the resulting calcium sulfate by filtration.

5. The process of manufacturing acetic acid which comprises the interaction at 80° to 105° C., for 6 to 24 hours, of sulfuric acid and acetate of lime, in the presence of an amount of water equal to 35 to 100 percent of the weight of the calcium acetate, returning to the reaction any substances that may be volatilized, and filtering the precipitated calcium sulfate.

6. The process of manufacturing acetic acid which comprises the interaction, at 105° C., for nine hours, of a mixture of 64 parts by weight of concentrated sulfuric acid, 39 of water, 26 of acetic acid, and 100 of calcium acetate and separation of the resulting solution, comprising acetic acid, from the calcium sulfate by filtration.

ROBERT H. VAN SCHAACK, Jr.
ROBERT CALVERT.